United States Patent [19]

Sims

[11] Patent Number: 5,421,555

[45] Date of Patent: Jun. 6, 1995

[54] QUICK RELEASE TRAILER JACK

[76] Inventor: Don M. Sims, Rte. 3, Glen Rose Hwy., Stephenville, Tex. 76401

[21] Appl. No.: 98,028

[22] Filed: Jul. 28, 1993

[51] Int. Cl.$^6$ ............................................. B60S 9/02
[52] U.S. Cl. .................................. 254/420; 254/427; 254/97
[58] Field of Search ............... 254/420, 419, 427, 95, 254/96, 97, 6 R, 6 B, 6 C; 269/227, 182; 74/31, 89.17, 422

[56] References Cited

U.S. PATENT DOCUMENTS

| 150,900 | 5/1874 | Silver et al. ........................ 269/182 |
| 276,028 | 4/1883 | Gould ..................................... 74/31 |
| 968,223 | 8/1910 | Willour . |
| 1,324,721 | 12/1919 | Benedict . |
| 1,370,344 | 3/1921 | Morrison . |
| 1,435,884 | 11/1922 | Stone . |
| 1,539,106 | 5/1925 | Baker ..................................... 74/31 |
| 3,201,087 | 8/1965 | Dalton ................................. 254/419 |
| 3,861,648 | 1/1975 | Glassmeyer ........................ 254/419 |
| 3,934,852 | 1/1976 | Weber et al. . |
| 4,702,458 | 10/1987 | Kendrick . |
| 4,842,252 | 6/1989 | McMahan . |
| 4,978,104 | 12/1990 | Gipson, Jr. . |

Primary Examiner—Robert C. Watson
Attorney, Agent, or Firm—Guy V. Manning

[57] ABSTRACT

A quick release trailer jack comprises a vertical support mast extending through a jack body. Pinion and worm gears housed in the body couple a crank to a rack gear on the mast for vertically raising and lowering the mast relative to the trailer. A plunger coaxial with the pinion gear permits an operator to axially translate the pinion gear lateral the mast axis, thereby decoupling the crank from the rack gear. The pinion gear slides into a cylindrical cavity containing a biasing spring which returns the pinion gear into its normal position, re-coupling the crank and the rack, when the operator releases the plunger.

5 Claims, 3 Drawing Sheets

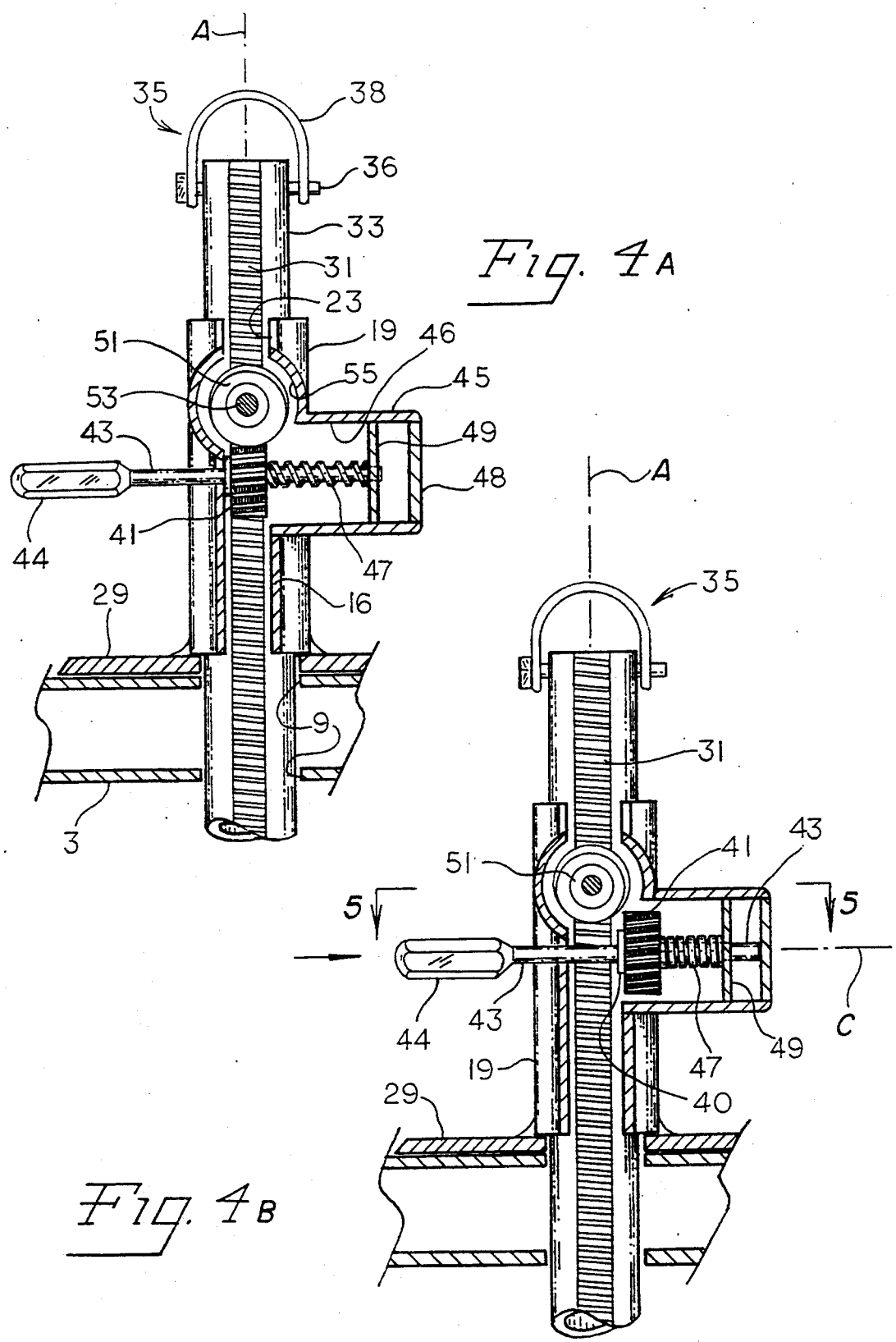

QUICK RELEASE TRAILER JACK

BACKGROUND OF THE INVENTION

1. Field of the Invention

This invention relates generally to improvements to trailer jacks and particularly to release mechanisms for trailer jacks which permit quick vertical shifting of the support leg, or mast, to avoid time consuming cranking necessary with conventional jacks.

2. Description of Related Art

Jacks for trailer tongues long have been available to support the weight of the tongue while the trailer is parked or when coupling it to a towing vehicle. Such jacks usually comprise a body having a cylindrical silo through which a support mast extends both above and below the tongue. The mast terminates in some type of footing, usually a wheel, and a rack gear extends along one side substantially the length of the mast. Within the jack body, a series of gears couples a crank handle to the rack gear to assist an operator in raising or lowering the mast under the load of the trailer tongue. This gear reduction system provides the operator a mechanical advantage that limits the force necessary to crank the handle by increasing the required number of rotations of the crank.

In preparation for towing, the mast must be cranked vertically upward to lift its foot out of the way of ground obstacles. Such activity conventionally involves cranking the mast a substantial portion of its length. This is due to the fact that the mast is fully extended to the ground to support the tongue at the hitch height, and the fact that it must be retracted fully to avoid all road obstacles. Absent some release mechanism to decouple the mast from the gear reduction system, however, the same number of rotations of the crank handle are necessary to move the unloaded mast as are required to move the loaded mast. Such cranking thus requires a substantial amount of time to raise and lower the mast. A need therefore exists for a means of mitigating the time necessary to raise and lower the support mast when it does not carry the load of the tongue.

Numerous devices provide a means of decoupling a portion of the gear reduction system to permit the mast to move free thereof, allowing an operator to lift or drop the mast quickly to a preferred vertical position while the system is disengaged. Kendrick, U.S. Pat. No. 4,702,458, provides a channel in which the rack gear travels that is wide enough to permit the rack gear to rotate axially and to decouple from the pinion drive gear. A retaining block must be lifted out of the way to permit the mast to rotate. Though simple in its design, Kendrick requires that the mast be free not only to shift vertically when lifted, but also to rotate axially, requiring the operator to move it rather precisely and simultaneously in two different dimensions. Gipson, U.S. Pat. No. 4,978,104, provides a spring loaded lever which decouples the drive pinion gear from the rack by moving it in a direction radial to the mast and away from the rack when a lever is depressed. Though the movements required of the operator are simple, Gipson involves multiple levers and moving parts which complicate the jack mechanism and increase its cost and risk of malfunction. A need exists for a simple and inexpensive mechanism which overcomes the shortcomings of these and other prior art devices.

SUMMARY OF THE INVENTION

Accordingly, it is an object of this invention to provide a quick release trailer jack which permits fast raising and lowering of the support mast for towing.

It is another object of this invention to provide a quick release trailer jack which temporarily decouples the gear reduction system within the jack from the crank handle.

It is another object of this invention to provide a quick release trailer jack which permits an operator easily to shift the mast in a single dimension.

It is another object of this invention to provide a quick release trailer jack that is mechanically simple and inexpensive to fabricate.

The foregoing and other objects of this invention are achieved by providing a quick release trailer jack comprising a vertical support mast extending through a jack body. Pinion and worm gears housed in the body couple a crank to a rack gear on the mast for vertically raising and lowering the mast relative to the trailer. A plunger coaxial with the pinion gear permits an operator to axially translate the pinion gear lateral the mast axis, thereby decoupling the crank from the rack gear. The pinion gear slides into a cylindrical cavity containing a biasing spring. When the operator releases the plunger, the spring returns the pinion to its normal position, re-coupling the crank and the rack.

BRIEF DESCRIPTION OF THE DRAWINGS

The novel features believed characteristic of the present invention are set forth in the appended claims. The invention itself, however, as well as a preferred mode of use and further objects and advantages thereof, will best be understood by reference to the following detailed description of an illustrative embodiment when read in conjunction with the accompanying drawings, wherein:

FIG. 4A shows a right side elevational section as indicated in FIG. 3.

FIG. 4B details the view of FIG. 4A with the plunger depressed to decouple the pinion gear.

DETAILED DESCRIPTION OF A PREFERRED EMBODIMENT

Figure 1:
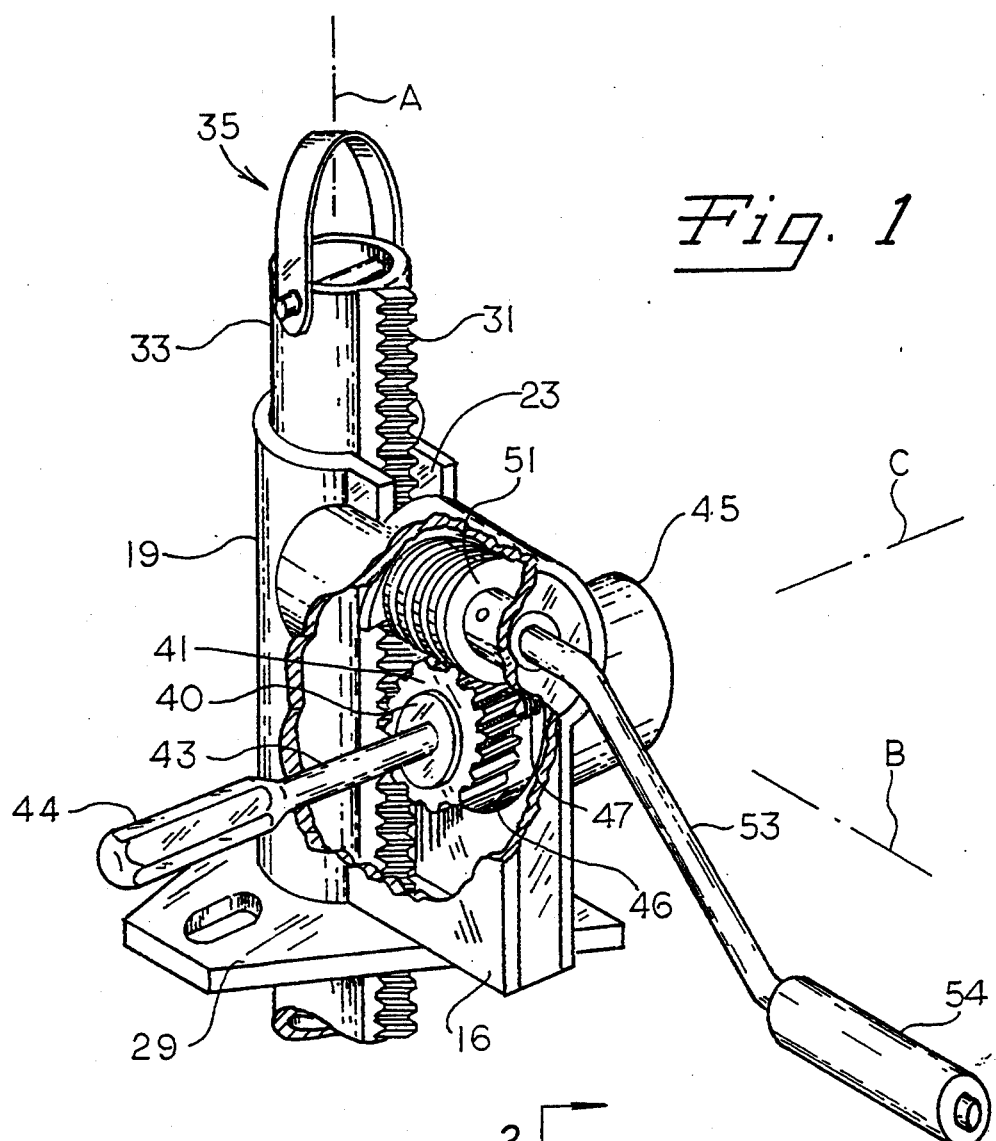
FIG. 1 represents an upper perspective view of the jack with interior gears shown in cutaway.
Figure 5:
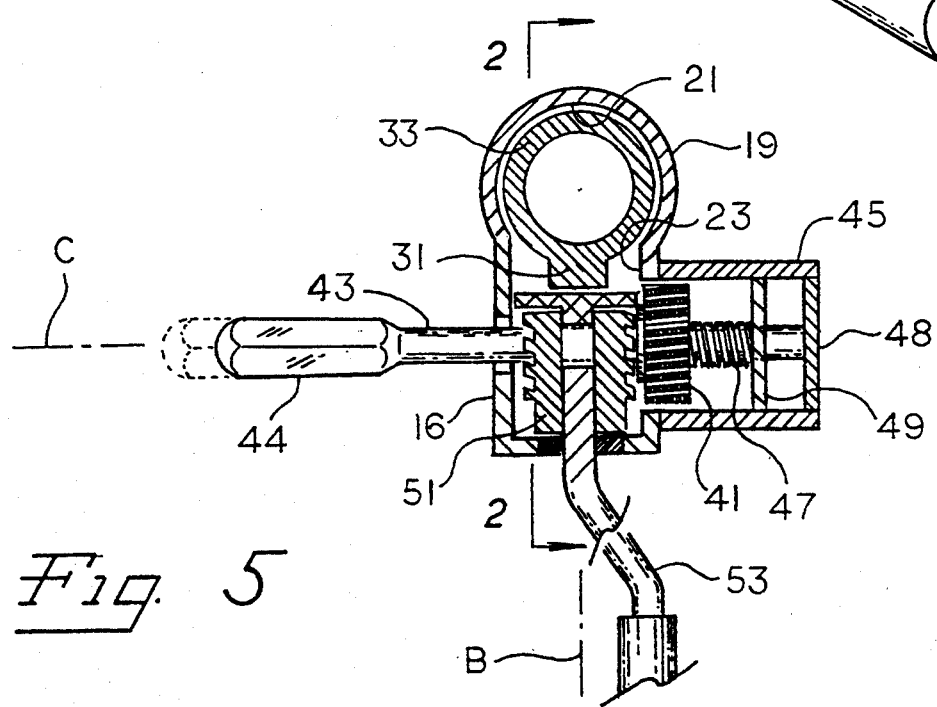
FIG. 5 shows a top section of the trailer jack of FIG. 4B.
Figure 2:
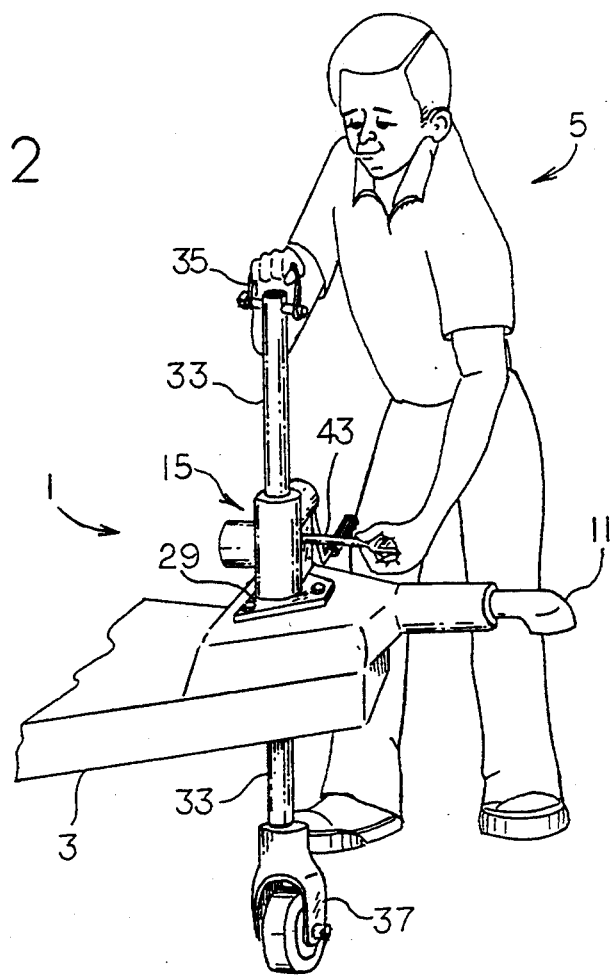
FIG. 2 depicts an operator shifting the mast of the jack while depressing the plunger.
Figure 3:
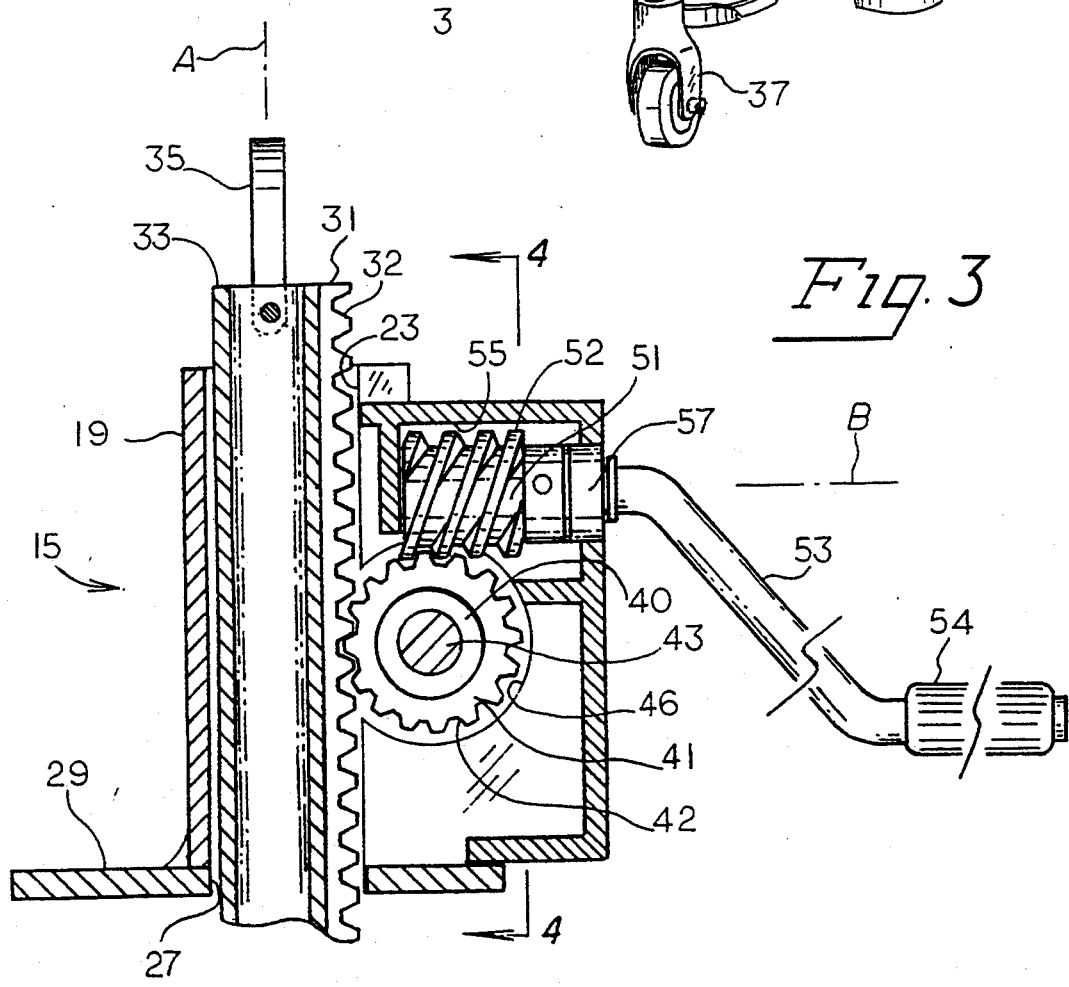
FIG. 3 shows a front elevational section of the trailer jack.

With reference now to the figures, and in particular to FIG. 2, trailer jack 1 of the present invention is shown mounted to tongue 3 of a trailer (not shown). Horizontal flange 29 is shown in FIG. 2 as being bolted to tongue 3, but it may be attached by any suitable alternative means such as welding (not shown). Mast 33 extends vertically through body 15 and tongue 3 by cooperating with interior shaft 21 (FIG. 3). It terminates on its lower end in wheel 37 and on its upper end in handle 35. Operator 5 grasps handle 35 to shift mast 33 relative to body 15 by compressing plunger 43.

Referring now additionally to the remaining figures, jack body 15 is shown comprising a cylindrical silo 19 extending vertically above flange 29 from aperture 27 through which mast 33 extends. Rack gear 31 having teeth 32 extends substantially the longitudinal length of mast 33. Rack 31 cooperates with channel 23 to retain mast 33 substantially at a fixed angular position about vertical axis A. Handle 35 comprises shackle 38 attached to the top end of mast 33 by pin 36. One having ordinary skill in the art will recognize that handle 35 may comprise alternate configurations without departing from the spirit and scope of the present invention.

Extending radially from silo 19 adjacent channel 23 is gear housing 16 containing worm gear 51 and pinion gear 41. Worm gear 51 rotates within cylindrical chamber 55 and couples to crank 53. Crank 53 terminates in grip 54 exterior to housing 16 and rotates about axis B to turn worm gear 51. Spiral teeth 52 on worm gear 51 mesh with teeth 42 of pinion 41 which couples worm gear 51 to rack 31. Rotation of crank 53 thereby causes pinion 41 to rotate about axis C. Teeth 42 in turn mesh with rack teeth 52 to shift mast 33 vertically relative to silo 19 in response to rotation of pinion 41 and crank 53.

Plunger 43 serves as an axle for pinion 41 and extends axially therefrom to terminate in knob 44 exterior to gear housing 16. Opposite plunger 43 within gear chamber 16 is cylinder 45 defining coaxial cavity 46. Cavity 46 receives pinion 41 when plunger 43 is pushed along axis C toward gear housing 16. Flange 40 affixed plunger 43 beside pinion 41 opposite cavity 46 pushes against pinion 41 when force is applied to knob 44 along axis C toward cavity 46. This permits pinion 41 to spin freely on plunger 41 during operation. Cavity 46 is closed opposite pinion 41 by end cap 48 and contains biasing spring 47 between pinion 41 and baffle 49. Plunger 43 extends through and is supported by baffle 49. Spring 47 cushions the compressive force applied to plunger 43 when it is pushed toward cylinder 45. Pinion 41 retracts fully into cavity 46 when sufficient pressure to overcome spring 47 is exerted using plunger 43. Worm gear 51 is retained in place by chamber 55 and by bushing 57 surrounding crank 53 where it enters gear housing 16. When operator 5 releases handle 43, spring 47 returns pinion 41 to its normal position juxtaposed rack 31 and worm 51, thereby re-coupling them.

In operation, quick release trailer jack 1 simplifies preparation of a trailer for towing and parking. Operator 5 positions a towing vehicle (not shown) so that ball socket 11 (FIG. 2) may be coupled to a hitch on the towing vehicle. Operator 5 then rotates crank 53 to lift shaft 33 relative to tongue 3. This lowers tongue 3 and ball socket 11 until the towing vehicle supports tongue 3. Operator 5 then may continue to crank no-longer-loaded-mast 33 until it is fully raised. Alternately, he may press knob 44 to disengage pinion 41 from the gear reduction system by pushing it into cavity 46, thereby decoupling rack 31 from worm 51. Simultaneously, he grasps handle 35 and lifts mast 33 until wheel 37 is juxtaposed the bottom of tongue 3 (not shown). He then releases knob 44 and permits spring 47 to return pinion 41 to mesh with rack 31, thereby supporting its weight and holding it in its raised position. Teeth 52 of worm gear 51 again engage teeth 42 of pinion 41 and prevent its rotation under the weight of mast 33.

In the described preferred embodiment, no latch is required to prevent mast 33 from descending inadvertently when subjected to jostling from rough roads. As best seen in FIGS. 4A and 4B, teeth 32 of rack gear 31 are pitched sloping downward toward cavity 46. Likewise, pinion 41 has teeth sloping downward toward 46 where they mesh with rack gear 31 (seen in FIGS. 4A and 4B on the opposite side of pinion 41 from rack gear 31 and therefore upside down and sloping downward away from cavity 46). When mast 33 is retracted to its upper vertical position for traveling, the weight of mast 33 tends to exert an axial force on pinion 41. Because of the direction of the pitch of the teeth on these gears, however, pinion 41 is forced against the wall of gear housing 16 opposite cavity 46. Were the pitch in the opposite direction, the axial force would force pinion 41 into cavity 46, thereby releasing mast 33. One having ordinary skill in the art will recognize that a latch mechanism (not shown) could be provided to overcome the problem in such case.

Once towing is finished, operator 5 grasps handle 35 to support the weight of mast 33. He then pushes knob 44 toward housing 16, decoupling pinion 41 to free mast 33 again, enabling it to slide within shaft 21 of silo 19. He then lowers mast 33 to the desired position and releases knob 44 again to re-couple worm 51 to rack 31. If operator 5 fails to grasp handle 35 to support the weight of mast 33, it will simply fall through shaft 21, when he pushes knob 44 sufficiently to disengage pinion 41 from rack 31, until wheel 37 contacts the ground.

This latter practice of simply dropping mast 33 is not recommended for routine lowering of mast 33 because it increases wear on pinion 41 and rack 31. It will be recognized by one having ordinary skill in the relevant art, however, that this practice will be common and even may be performed with the operator's foot. This could be valuable, for example, in emergencies or when operator 5 has his hands full. Channel 23 keeps rack 21 aligned for recoupling without requiring control by the hands of operator 5. Thus, the quick release jack of the present invention permits a far simpler and quicker method of shifting of mast 33 than possible with many of the prior art references. Once mast 33 is recoupled, operator 5 rotates crank 53 to lower mast 33 further, causing it to assume the load of tongue 3 and lift socket 11 from the towing vehicle.

Improved quick release jack 1 requires no special materials beyond those commonly used to fabricate conventional trailer jacks, typically steel. Obviously, material selection depends upon anticipated loads. Jack 1 could be fabricated, for example, from thermoset plastics having properties of dimensional stability under load as long as overall jack strength is sufficient. This decision is not dependent upon the improvement described herein, but correlates with material strengths necessary for designing jacks lacking the improvement.

One having ordinary skill in the relevant art will recognize that the exact orientation and location of worm gear 51 and pinion 41 may vary from the arrangement depicted without departing from the spirit and scope of the present invention. Conventional trailer jacks can be modified to incorporate the present invention by adding cylinder 45 containing spring 47 and baffle 49 within cavity 46 and by installing plunger 43 as the axle of the stock pinion gear. A suitable steel gear box adaptable for this purpose is available as Bulldog Ref. No. 281200 from The Hammerblow Corporation of Wausau, Wis.

The trailer jack of the present invention provides a simple and elegant solution to the need for a release mechanism for quickly shifting support mast 33 when it is not loaded with the weight of tongue 3. Plunger 43 and knob 44 comprise simply an extension of the axle of pinion 41, and cylinder 45 provides a simple cavity 46 which prevents dust and other contaminants from fouling the gear reduction system. Cavity 46 also retains spring 47 ready to bias pinion 41 back into operating position when knob 44 is released. The arrangement is simple, inexpensive to make and has only one moving part, spring 47, more than conventional trailer jacks having no quick release mechanism. Movement of pinion 41 transverse vertical axis A, in lieu of moving it radially, obviates the need for complex lever arrangements or locking devices to hold it in place for operation.

While the invention has been particularly shown and described with reference to a preferred embodiment, it will be understood by those skilled in the art that various changes in form and detail may be made therein without departing from the spirit and scope of the invention. For example, plunger 43 and knob 44 could be supplemented with a lever and fulcrum (not shown) to make depressing pinion 41 into cavity 46 easier. Plunger 43 also could be replaced with a device that pulls pinion 41 into cavity 46 instead of pushing it from the opposite side of housing 16 as depicted. Also, a suitable locking device could be added to retain pinion 41 in a decoupled position should this be deemed desirable. Crank 53 could be removable (not shown) and could have a safety catch (not shown) to prevent inadvertent rotation of worm gear 51 under the weight of the trailer, were this thought necessary. Finally, though the present invention has been depicted and discussed relative to a trailer tongue, it has other applications as well, such as for dolly jacks for floats and eighteen-wheeler trailers or the like.

I claim:

1. A quick release trailer jack comprising
a body adapted to be attached to a trailer tongue, the body having a vertical shaft having a shaft axis normal the trailer tongue;
a mast adjustably cooperating with the shaft and having a bottom end bearing a footing and a top end bearing a handle means;
a rack coupled along a longitudinal length of the mast and bearing transverse teeth;
a pinion gear having a pinion axis transverse the shaft axis, the pinion having pinion teeth adapted to mesh with the teeth of the rack;
a worm gear coupled to a crank and having spiral teeth adapted to mesh with the pinion teeth;
a cavity extending coaxial from the pinion gear and adapted to receive the pinion gear internally;
a plunger extending exterior the body opposite the cavity; and
a spring within the cavity and coaxial the plunger between the pinion and an end of the cavity opposite the pinion gear.

2. A quick release trailer jack comprising
a body adapted to be attached to a trailer tongue, the body having a vertical shaft having an axis;
support means coaxial and adjustably cooperating with the shaft to extend normal the trailer tongue;
adjustment means for adjusting the support means;
gear reduction means within the body for coupling the support means to the adjustment means;
decoupling means adapted to laterally translate a component of the gear reduction means transverse the shaft axis for decoupling the support means from the adjustment means, the decoupling means having
a pinion gear coupled between the support means and the adjustment means;
a cavity coaxial with the pinion gear and axially offset therefrom;
a plunger coupled to and coaxial with the pinion opposite the cavity and extending exterior the body, the plunger adapted to force the pinion into the cavity in response to axial force applied to the plunger from exterior the body; and
a spring within the cavity between the pinion and an end cap of the cavity.

3. A quick release trailer jack comprising
a support mast having a vertical axis;
a body substantially surrounding at least a segment of tile support mast, the body having a flange normal the vertical axis and adapted for attaching to the trailer;
a rack coupled to the mast and cooperating with a pinion within the body;
a worm gear within the body coupled to the rack through the pinion, the worm gear attached to a crank extending exterior the body;
decoupling means adapted to axially translate the pinion gear transverse the vertical axis for decoupling tile rack from the worm gear, the decoupling means having
a cavity coaxial with the pinion and laterally offset therefrom when the pinion is coupled between the rack and the worm gear; and
a plunger coaxial with the pinion opposite the cavity and extending exterior the body, the plunger adapted to force the pinion into the cavity in response to axial force applied to the plunger from exterior the body.
recoupling means for recoupling the pinion between the worm gear and the rack, the recoupling means having
a spring within the cavity between the pinion and an end cap of the cavity.

4. An improved trailer jack comprising, in combination
a conventional trailer jack having
a horizontal flange having a central aperture and adapted to attach the trailer jack to a trailer;
vertical walls extending coaxial the aperture and normal the flange, the walls defining an interior shaft having a vertical axis, the walls further defining a channel parallel the vertical axis and communicating between the shaft and an exterior of the body, the body further having a gear housing extending radial the vertical axis adjacent the channel;
a mast slidably cooperating with the shaft and the aperture;
a rack gear parallel the vertical axis along an exterior surface of the mast, the rack gear cooperating with the channel to extend toward the gear housing;
a worm gear within the gear housing, the worm gear having spiral teeth and a crank extending exterior the housing; and
a pinion gear coupled between the worm gear and the rack gear within the gear housing, the pinion gear adapted to rotate about a pinion axis oriented transverse the vertical axis; and
disengaging means coupled to the pinion gear and adapted to cause the pinion gear to move along the pinion axis for disengaging the pinion gear frown the rack gear in response to stimulus from an operator;

a cavity coaxial with the pinion axis and adapted to receive the pinion when it is disengaged from the rack; and return spring means within the cavity between the pinion gear and an end wall of the cavity for returning the pinion gear into coupled engagement with the rack and worm gears when the stimulus is removed.

5. An improvement for a trailer jack, the jack comprising a support mast having a vertical axis; a body substantially surrounding at least a segment of the support mast, the body having a flange normal the vertical axis and adapted for attaching to the trailer; a rack coupled to the mast and cooperating with a pinion within the body; a worm gear within the body coupled to the rack through the pinion, the worm gear attached to a crank extending exterior the body; the improvement comprising decoupling means adapted to axially translate the pinion gear transverse the vertical axis for decoupling the rack from the worm gear, the decoupling means having a cavity coaxial with the pinion and laterally offset therefrom when the pinion is coupled between the rack and the worm gear; and a plunger coaxial with the pinion opposite the cavity and extending exterior the body means, the plunger adapted to force the pinion into the cavity in response to axial force applied to the plunger from exterior the body means; and recoupling means for recoupling the pinion between the worm gear and the rack, the recoupling means having a spring within the cavity between the pinion and an end cap of the cavity.

* * * * *